United States Patent
Karten et al.

(10) Patent No.: US 7,153,212 B1
(45) Date of Patent: Dec. 26, 2006

(54) LIGHT ATTACHMENT FOR PORTABLE ELECTRONIC DEVICE

(75) Inventors: Stuart A. Karten, Venice, CA (US); Dennis L. Schroeder, Hermosa Beach, CA (US); Eric W. Olson, Venice, CA (US); Simon A. Sollberger, Venice, CA (US)

(73) Assignee: Mad Catz, Inc., San Diego, CA (US)

( * ) Notice: Subject to any disclaimer, the term of this patent is extended or adjusted under 35 U.S.C. 154(b) by 434 days.

(21) Appl. No.: 10/355,811

(22) Filed: Jan. 30, 2003

Related U.S. Application Data

(60) Provisional application No. 60/353,731, filed on Feb. 1, 2002.

(51) Int. Cl.
*A63F 13/08* (2006.01)
*F21L 14/00* (2006.01)

(52) U.S. Cl. ............... 463/47; 273/148 B; 362/418; 362/428

(58) Field of Classification Search ............ 463/47; 362/317, 351, 352, 368, 370, 371, 382, 418, 362/427, 428, 640–659; 206/315.1; 273/150; 248/585–588
See application file for complete search history.

(56) References Cited

U.S. PATENT DOCUMENTS

| | | |
|---|---|---|
| 1,651,307 A | 11/1927 | Wilkinson |
| 3,065,339 A | 11/1962 | Fahey, Jr. |
| D238,959 S | 2/1976 | Kurokawa |
| 4,032,772 A | 6/1977 | Mowbray |
| D251,687 S | 4/1979 | Kurokawa |
| 4,312,507 A | 1/1982 | Smith et al. |
| 4,364,104 A | 12/1982 | Holahan et al. |
| 4,381,144 A | 4/1983 | Breslau |
| 5,091,832 A | 2/1992 | Tortola et al. |
| 5,115,383 A | 5/1992 | Lee |
| 5,117,339 A | 5/1992 | Tortola et al. |
| 5,122,937 A | 6/1992 | Stoudemire |
| 5,122,941 A | 6/1992 | Gross et al. |
| 5,130,907 A | 7/1992 | Tortola et al. |

(Continued)

FOREIGN PATENT DOCUMENTS

JP      10-243381      9/1998

(Continued)

OTHER PUBLICATIONS http://ledmuseum.home.alt.net/1990.htm, The LED Museum, "1990-1999: LEDS Break The Quantum Barrier".

(Continued)

*Primary Examiner*—Xuan M. Thai
*Assistant Examiner*—Matthew D. Hoel
(74) *Attorney, Agent, or Firm*—Fish & Richardson P.C.

(57) ABSTRACT

A light attachment for electronic devices may include a base, a deployable arm, a light source and deployment mechanism. The base can be removably attached to an electronic device. The light attachment has a retracted, closed position, and a deployed, open position. While in either postilion, the light attachment is compact and can reside on the electronic device permanently or semi-permanently without interfering with the screen or other functions of the electronic device to which it is attached. The deployment mechanism is a retractable mechanism that has engaged and disengaged states. When the deployment mechanism is actuated while the collapsible light attachment is in its retracted position, the deployable arm is caused to be deployed and the light source is caused to be turned on. Once deployed, the movable arm is situated in a predetermined position optimal for illuminating a LCD screen or other features of the electronic device.

62 Claims, 4 Drawing Sheets

U.S. PATENT DOCUMENTS

| | | | |
|---|---|---|---|
| 5,136,477 A | 8/1992 | Lemmey | |
| 5,160,200 A | 11/1992 | Cheselske | |
| 5,161,879 A | 11/1992 | McDermott | |
| 5,165,779 A | 11/1992 | Tortola et al. | |
| 5,172,974 A | 12/1992 | Riban | |
| 5,183,325 A | 2/1993 | Hurdle | |
| 5,203,622 A | 4/1993 | Sottile | |
| 5,325,278 A | 6/1994 | Tortola et al. | |
| 5,325,280 A | 6/1994 | Tortola et al. | |
| 5,379,201 A | 1/1995 | Friedman | |
| 5,437,066 A | 8/1995 | Mills et al. | |
| 5,486,986 A | 1/1996 | Brada | |
| 5,547,399 A | 8/1996 | Naghi et al. | |
| 5,561,346 A | 10/1996 | Byrne | |
| 5,590,950 A | 1/1997 | Hildebrand | |
| D377,840 S | 2/1997 | Chang | |
| 5,615,945 A | 4/1997 | Tseng | |
| 5,636,275 A * | 6/1997 | Takagi et al. | 379/433.13 |
| 5,642,931 A | 7/1997 | Gappelberg | |
| 5,671,996 A | 9/1997 | Bos et al. | |
| 5,695,271 A * | 12/1997 | Zeller | 362/98 |
| 5,707,137 A | 1/1998 | Hon | |
| 5,803,572 A | 9/1998 | Brada | |
| 5,803,579 A | 9/1998 | Turnbull et al. | |
| 5,842,779 A | 12/1998 | Siebert | |
| 5,851,063 A | 12/1998 | Doughty et al. | |
| 5,868,487 A | 2/1999 | Polley et al. | |
| D408,567 S | 4/1999 | Coe | |
| 5,899,553 A | 5/1999 | Howell | |
| 5,908,294 A | 6/1999 | Schick et al. | |
| D418,240 S | 12/1999 | Sherman | |
| 6,142,644 A * | 11/2000 | Leung | 362/98 |
| D435,679 S * | 12/2000 | Naghi et al. | D26/103 |
| 6,186,636 B1 | 2/2001 | Naghi et al. | |
| 6,260,984 B1 * | 7/2001 | Naghi et al. | 362/186 |
| 6,273,581 B1 * | 8/2001 | Neiser | 362/109 |
| D448,426 S | 9/2001 | Yu | |
| 6,318,873 B1 * | 11/2001 | Naghi et al. | 362/85 |
| D452,026 S * | 12/2001 | Naghi et al. | D26/60 |
| 6,361,184 B1 * | 3/2002 | Hallgrimsson et al. | 362/188 |
| 6,422,715 B1 | 7/2002 | Naghi et al. | |
| 6,634,763 B1 * | 10/2003 | Leifer et al. | 362/109 |
| 2001/0043468 A1 * | 11/2001 | Krietzman et al. | 362/85 |
| 2002/0131263 A1 * | 9/2002 | Naghi et al. | 362/98 |

FOREIGN PATENT DOCUMENTS

| | | |
|---|---|---|
| WO | WO 98/01669 | 1/1998 |

OTHER PUBLICATIONS http://www.sciam.com/interview/2000/070500nakamura, Scientific American: Interviews: Shuji Nakamura: Jul. 5, 2000, Blue Chip.

http://www.thelibraryshop.org/itbitbooklig.html, The Itty Bitty book Light.

http://www.sgm.simplenet.com/boutique/special/sgm28367.htm, Sierra Gold Marketing SGM28367, Clip On Light.

http://www.amozon.com/exec/objdos/ASIN/b00000ljzm/103-0091683-4435023, Adventure Book Light and Flashlight.

http://www.smartcomputing.com/editorial/article.asp?article=articles%2F1994%2Fdec94, "Mobile Madness! Astonishing Accessories for Notebook Computers", Mobile Computing, vol. 5, Issue 12, Dec. 1994.

http://www.led.net/pages/PRN_5.htm, Product Release Notice #5, DecorLED A19 Solid State Lamps, Jul. 31, 1998.

http://www.hdssystems.com/ActionLightHistory.htm, Schneiker, "The Birth of a New Lamp System", Apr. 1999.

http://www.audax.uk.net/lights/ledpage3.htm, Bicycle Lighting—White LED Light, May 1998.

http://www.nvko.com, Super WormLight.

http://www.pelicanacc.com/showcase/category6.php, Flip-n-Light.

http://www.aristagroup.com/nuby/gbc_cat.html, Game Light and Magnifier NB-17.

http://www.drugstore.com/axp71246/franzus/deluxe_travel_book_light.htm, Franzus Deluxe Travel Book Light.

http://www.tim-store-com/book-lights, Book Lights.

* cited by examiner

LIGHT ATTACHMENT FOR PORTABLE ELECTRONIC DEVICE

CROSS-REFERENCE TO RELATED APPLICATION

This application claims priority to U.S. Provisional Application Ser. No. 60/353,731, filed Feb. 1, 2002, which is incorporated by reference.

BACKGROUND

The following disclosure relates to a light attachment for hand-held or similarly sized portable electronic devices. For example, the light attachment can be used with all types of electronic devices, namely, hand-held computers and hand-held computer games, personal digital assistants ("PDAs"), mobile or cordless telephones, calculators, remote controls, or other similar electronic devices.

FIG. 1 depicts a conventional light attachment 100 that can be coupled with an electronic device (not shown). The light attachment 100 is formed of a plastic-coated electrical wire having a first end 104 and a second end 106. The first end 104 is terminated by a light fixture 110 that includes a bulb or light emitting device (LED) for illuminating the electronic device, while the second end 106 is terminated by a plug 108, which connects the light attachment 100 to the electronic device.

FIG. 2a depicts another conventional light attachment 200 having a base 202, which attaches to the electronic device (not shown) by fasteners 216 and provides an electrical link connection to the electronic device by a plug 214. The light attachment 200 also has a rigid flat surface 204 that has a first edge 210 and a second edge 212. The second edge 212 is connected to the base 202 by hinges 206, while the first edge 210 includes a light source 208. FIG. 2b shows the light attachment 202 in its opened position 300 while connected to an electronic device 302. The opened position 300 allows the light source 208 to illuminate the screen 304 of the electronic device 302. FIG. 2c shows the light attachment 202 in a closed position 400. In the closed position 400, the flat surface 204 covers the electronic device screen 304. Before a user can use the electronic device while the conventional light attachment 200 is in the closed position 400 (FIG. 2c), the user must first either move the light attachment 202 into its opened position 300 (FIG. 2b) or remove the light attachment 202 from the electronic device 302.

SUMMARY

The collapsible light attachment for portable electronic devices disclosed below has many advantageous features. For instance, the collapsible light attachment is small and lightweight, yet sturdy enough to withstand every day wear and tear. Further, the collapsible light attachment has a deployable arm that folds into a compact retracted position, allowing it to snugly attach to the electronic device to which it is coupled. The compact retracted position helps prevent the light attachment from interfering with the LCD screen or functions of the electronic device, making it unnecessary to disengage or deploy the light attachment before using or storing the electronic device. As a result, the collapsible light attachment can permanently reside on the electronic device, reducing the risk of misplacing or losing the light attachment.

Another advantage of the disclosed collapsible light attachment is its deployment mechanism. The deployment mechanism is a button, switch, trigger, lever or other similar retractable mechanism that has engaged and disengaged states. When the deployment mechanism is actuated while the collapsible light attachment is in its retracted position, the deployable arm is caused to be deployed and the light source is caused to be turned on. Once deployed, the movable arm is situated in a predetermined position optimal for illuminating the LCD screen or other features of the electronic device, minimizing the need for the user to reposition the collapsible light attachment before or while using the electronic device. Once the deployable arm is collapsed into the retracted position, the deployment mechanism is reset and the light source is caused to be turned off. As a result, there is no need for a separate on/off switch.

The details of one or more embodiments are set forth in the accompanying drawings and the description below. Other features and advantages will be apparent from the description and drawings, and from the claims.

DETAILED DESCRIPTION

The collapsible light attachment described here is an accessory for portable electronic devices, namely, hand held computers and hand held computer games, personal digital assistants (known as "PDAs"), mobile or cordless telephones, calculators, remote controls, or other similar electronic devices. The collapsible light attachment is designed to illuminate the screen or other pertinent parts of the electronic device to which it is attached, for example, buttons, switches, keyboard, etc.

Figure 1:
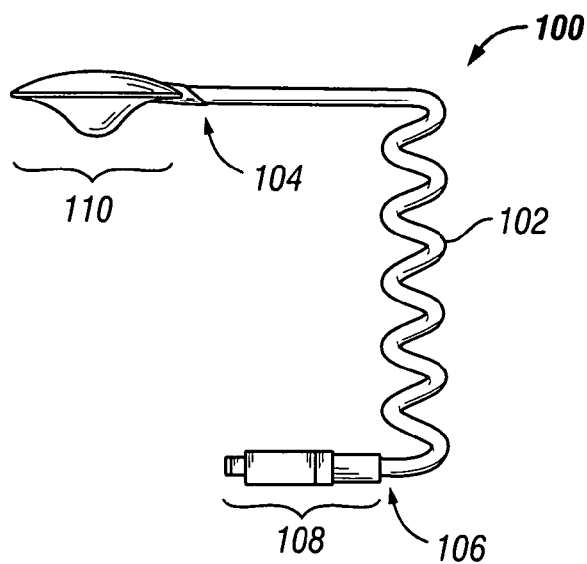
FIG. 1 is a conventional light attachment for an electronic device.
Figure 2A:
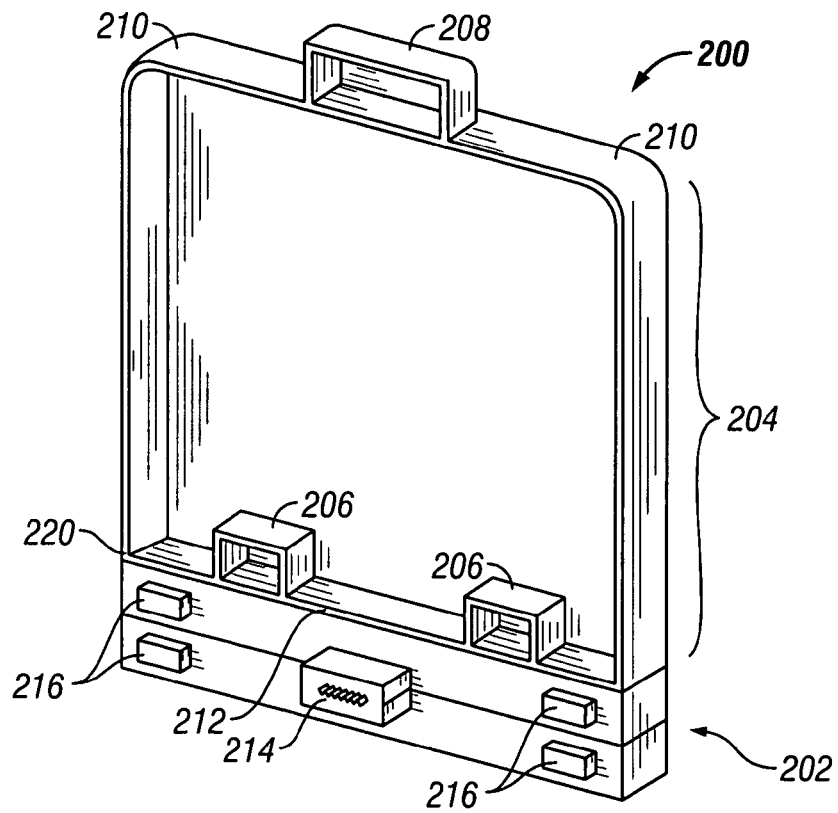
FIG. 2a is another conventional light attachment for an electronic device.
Figure 2B:
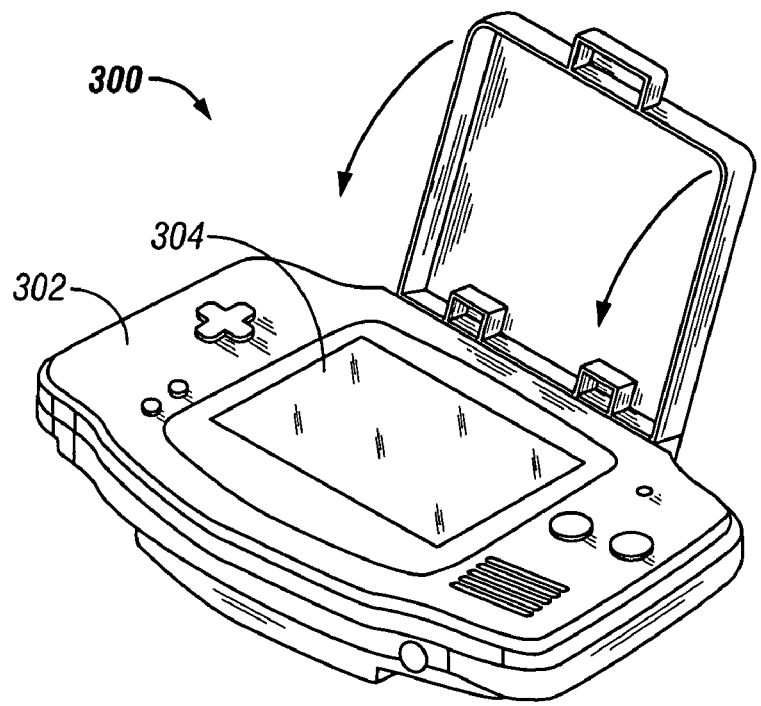
FIG. 2b shows the light attachment of FIG. 2a is an open position.
Figure 2C:
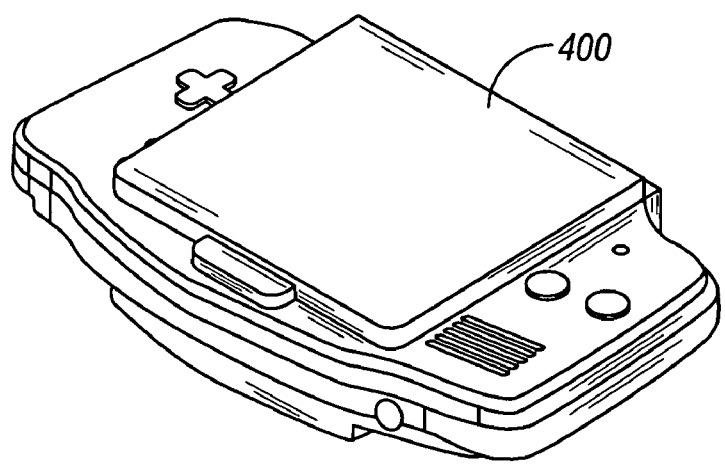
FIG. 2c shows the light attachment of FIG. 2a in a closed position.
Figure 3:
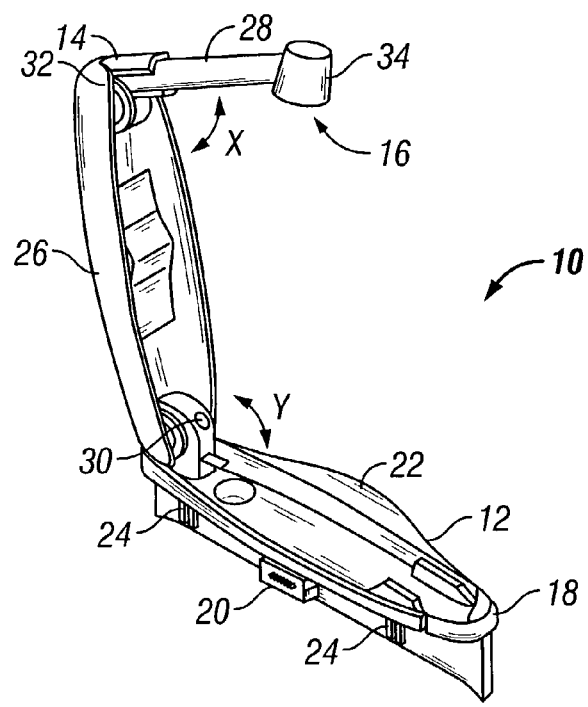
FIG. 3 is a collapsible light attachment in a retracted state while attached to an electronic device.

FIG. 3 shows an implementation of a collapsible light attachment 10 in a deployed position while detached from an electronic device. The collapsible light attachment 10 may include several components, including a base 12, a deployable arm 14, a light source 16, and a deployment mechanism 18 such as a button, switch, trigger, lever or other similar retractable mechanism that has engaged and disengaged states. The collapsible light attachment 10 can be made of plastic, metal or any other material capable of being molded, extruded, or otherwise formed into the desired shape.

The base 12 of the collapsible light attachment 10 as seen in FIG. 3 incorporates a connector or plug 20 for insertion into the serial port or other outlet of an electronic device with which it is used. The plug 20 can draw power from the electronic device to illuminate the light source 16, making an external power supply or batteries unnecessary. The plug 20 also can communicate with the electronic device in other ways, e.g. communicating control commands. In implementations of the collapsible light attachment 10 that incorporate a plug 20, the base 12 may include a pass-through serial port (or "linking port") 22 (not shown) positioned on the side opposite of the plug 20, so that other devices (e.g., linking cables) may be indirectly attached, in daisy-chain fashion, to the electronic device. For example, linking cables inserted into the pass-through serial port 22 could communicate electrically or otherwise with the electronic develop via the plug 20.

Alternatively, the collapsible light attachment 10 may not include a plug 20, but can instead draw power to illuminate the light source 16 from an external power supply or from batteries contained within the base 12. In either implementation, i.e., one with or without a plug 20, the base 12 may include fasteners 24 for detachably securing the collapsible light attachment 10 to the electronic device.

As shown in FIG. 3, the deployable arm 14 couples the base 12 to the light source 16. In one implementation of the collapsible light attachment 10, the deployable arm 14 has two segments 26 and 28. The first segment 26 is movably connected to the base 12 at one end and, at the other end, is movably connected to the second segment 28. The second segment 28 also has two ends, with one end having a light source 16, and with the other end, as already explained and shown in FIG. 3, being movably connected to the first segment 26. In other configurations, the arm 14 may be formed of only a single segment or of these or more segments. Moreover, the segments need not necessarily be rigid, but rather may be formed of materials that exhibit various degrees of elasticity and/or plasticity. The segments 26 and 28 can be movably connected by hinges or joints 32 and 34 loaded with a biasing force mechanism, for example, a spring 36 (not shown). The joints 26 and 28 permit the deployable arm 14 to be folded into a retracted position. As is more fully explained below, upon actuation of the activation deployment mechanism 18, the bias forces (operating in directions X and Y shown in FIG. 3) provided by the spring-loaded joints 32, 34 or similar mechanism cause the deployable arm 14 to move automatically from a retracted (closed) position (See FIG. 5) to a predetermined deployed (open) position (See FIGS. 3 and 4).

The light source 16 of the light attachment 10 is designed to illuminate the LCD screen and, if desired, additional or different features of the electronic device to which it is attached. The light source 16 may be an LED, a filament light bulb or any other light emitting source of suitable size and power to illuminate the LCD screen and/or other features of the electronic device. As shown in FIG. 3, the light source 16 is enclosed in a housing 34 shaped to protect the light and to direct the light emitted from the light source 16 in a desired direction. The housing 34 may be pivotally connected to the movable arm 14 so that a user can make fine adjustments to the direction of the emitted light. Alternatively, the housing 34 can be fixed in a stationary manner to the movable arm 14. The interior surface of the housing 34 may incorporate or be lined with reflective or other such material capable of increasing the intensity of the emitted light.

As shown in FIG. 3, the deployment mechanisms 18 can be located on the base 12 of the light attachment 10. The deployment mechanism 18 can, however, be located elsewhere on the collapsible light attachment 10 in other implementations. The deployment mechanism 18 can be a button, switch, trigger, lever or other similar mechanism that the engaged and disengaged states and capable of a being actuated by a user. Before being actuated, the collapsible light attachment 10 is in the retracted (closed) position and the deployment mechanism 18 is in an engaged state—that is, ready to be actuated to cause deployment mechanism 18 to deploy the light. Upon being actuated, the light attachment 10 transitions to the deployed (open) position and the deployment mechanism 18 is in a disengaged state. When the deployment mechanism 18 is actuated to a disengaged state by a user, two actions occur nearly simultaneously, or at least typically with some degree of overlap. First, the biasing forces (operating in directions X and Y shown in FIG. 3) of the spring loaded joints 32, 34 cause the deployable arm 14 to deploy automatically into a predetermined position, optimal for illuminating the LCD screen and/or other features of the electronic device. Second, the light source 16 is automatically turned on, because the movement of the deployable arm 14 closes the power circuit allowing electrical current to flow to the light source 16. Upon collapsing the light attachment 10 to its retracted position, the deployment mechanism 18 is again engaged, opening the circuit thereby interrupting the current flow between the light source 16 and the power source, and thus automatically turning off the light source 16. Because the deployment mechanism 18 is designed to cause the light source 16 to automatically turn on upon being activated, and to turn off the light source 16 when the light is retracted, no separate power on/off switch is required.

Furthermore, because the deployment mechanism 18 can be activated, causing both the light source 16 to automatically turn on and to deploy the deployable arm 14 to an optimal position for illuminating the electronic device LCD screen or other features, a user to generally need not adjust the position of the collapsible light attachment 10. As a result, the user can maintain his focus on the LCD screen or other functions of the electronic device while positioning the light source 16 with one touch. This is especially important, for instance, if the user is playing a game on an electronic device to which the collapsible light attachment 10 is attached.

Figure 4:
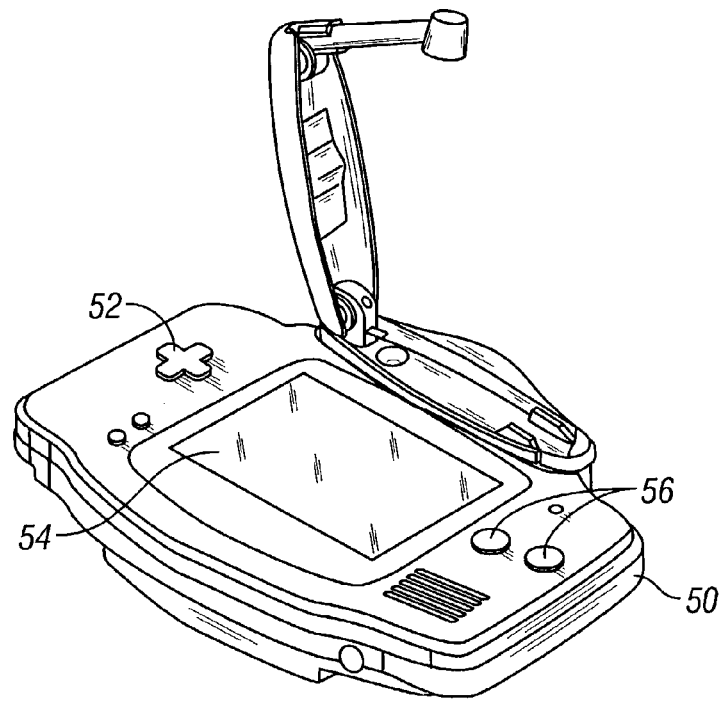
FIG. 4 is a collapsible light attachment in a deployed position while attached to an electronic device, in this case, a GAME BOY ADVANTAGE™ ("GBA™").
Figure 5:
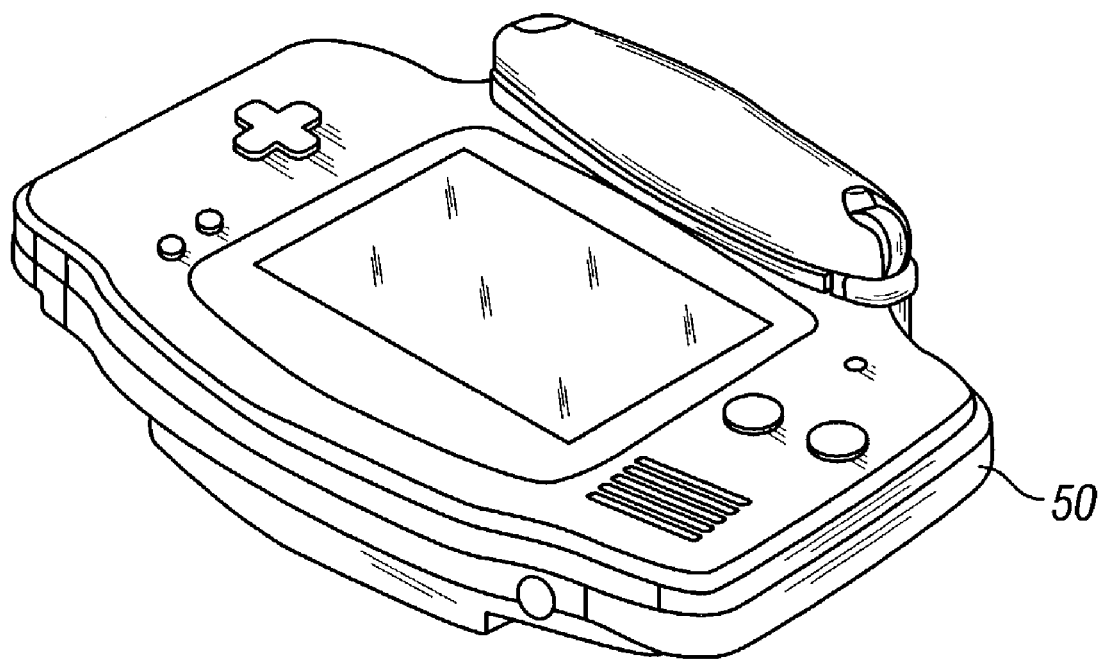
FIG. 5 is a collapsible light attachment in a deployed position while attached to a GBA™.

As depicted in FIGS. 4 and 5, the light attachment 10 is attached to a GAME BOY ADVANCE™ ("GBA™") 50. From these figures, one can envision how the user can simultaneously cradle the GBA™ 50 in his hands, manipulate the controls (i.e. the joystick pad and buttons) 52 of the GBA™ 50, for example, with his thumbs, and arcuate the deployment mechanism 18, for example, with his forefinger. As a result, the user does not have to remove his hands or fingers from the GBA™ 50 or its controls 52 in order to turn on the light source 16 when there is insufficient or low lighting. Rather, the user merely makes one switch move with his forefinger resulting in a quickly deployed and optimally positioned—light source. Furthermore, because the deployable arm 14 will automatically situate the light source 16 in a position optimal for illuminating the screen and/or controls of the GBA™ 50, the user need not release the controls or break his concentration in order to make adjustments to the collapsible light attachment 10 once it is deployed. As a result, the collapsible light attachment 10 and its functions permit a user to keep this undivided attention on the game he is playing.

FIG. 5 shows the collapsible light attachment 10 in its retracted position while attached to a GBA™ 50, while FIG. 4 shows the collapsible light attachment 10 in its deployed position while attached to a GBA™ 50. FIGS. 4 and 5 illustrate the compact size and non-obstructive nature of the collapsible light attachment 10, whether in the retracted or deployed position, relative to the GBA™ to which it is attached. For instance, while in the retracted position (FIG.

5), the collapsible light attachment 10 snugly attaches and consistently contours to the shape of the GBA™ 50 and minimizes interference with the LCD screen 56 and the controls 52 of the GBA™ 50. Similarly, the deployed position of the light causes no interference with the screen or controls of the GBA™ 50. As noted above, the base 12 of the collapsible light attachment 10 can have a pass-through serial port 22, so that other devices can be indirectly attached. In the case of using the collapsible light attachment 10 with a GBA™ 50, the pass-through serial port 22 allows multiple players to link to the GBA™ 50 via the pass-through serial port 22, thus retaining the multiplayer functionality of the GBA™ 50. As a result of its non-interference with the features and functionality of the electronic device to which it is attached, the collapsible light attachment 10 can reside permanently on the GBA™ 50. Among other advantages, permanent or semi-permanent residence of the collapsible light attachment 10 allows a user quick and easy access to the collapsible light attachment 10, permits for easy storage, and greatly reduces the risk of the collapsible light attachment 10 ever being misplaced or lost.

Other embodiments are within the scope of the following claims.

What is claimed is:

1. An apparatus for illuminating an electronic device, the apparatus comprising:
   a base;
   a light source;
   a deployable arm coupling the light source to the base;
   a deployment mechanism configured to transition the deployable arm automatically from a non-deployed position to a deployed position; and
   a housing having an inside and an outside, the housing movably attached to the deployable arm and configured to protect the light source in the non-deployed position, wherein the deployable arm is configured to automatically move the light source from the inside of the housing in the non-deployed position to the outside of the housing in the deployed position.

2. The apparatus of claim 1 wherein the non-deployed position comprises a closed position of the apparatus.

3. The apparatus of claim 2 wherein the light source is inoperative while the apparatus is in the closed position.

4. The apparatus of claim 1 wherein the light deployed position comprises an open position of the apparatus.

5. The apparatus of claim 4 wherein the light source is operative while the apparatus is in the open position.

6. The apparatus of claim 1 wherein the base comprises a connector for connecting the apparatus to the electronic device.

7. The apparatus of claim 6 wherein the connector is configured to provide physical and electrical connectivity between the apparatus and the electronic device.

8. The apparatus of claim 1 wherein the deployment mechanism is a button, switch lever or trigger.

9. The apparatus of claim 1 wherein the light source is at least partially surrounded by the housing.

10. The apparatus of claim 1 wherein the housing comprises a concave portion sufficient to substantially envelop the deployable arm and the light source inside in the non-deployed position.

11. The apparatus of claim 10 wherein the interior substantially concave position of the housing is made of reflective material.

12. The apparatus of claim 11 wherein the reflective material enhances the brightness of light emanating from the light source.

13. The apparatus of claim 1 wherein the deployable arm comprises one or more segments.

14. The apparatus of claim 1 wherein the deployable arm comprises two or more segments.

15. The apparatus of claim 14 wherein the segments of the deployable arm are movably connected.

16. The apparatus of claim 1 wherein the deployment mechanism further is configured to cause the light source to illuminate in connection with deployment of the deployable arm.

17. The apparatus of claim 1 further comprising an urging means for providing an urging force to cause the deployable arm to transition from a retracted position to a deployed position.

18. The apparatus of claim 17 wherein the urging means comprises one or more springs.

19. The apparatus of claim 17 wherein the urging means is coupled to the deployable arm.

20. The apparatus of claim 17 wherein the deployment mechanism is configured to cause the urging means to impart the urging force on the deployable arm.

21. An illumination apparatus comprising:
   a base configured to be attachable to a portable electronic device;
   a light source;
   a movable arm coupling the light source to the base; and
   a deployment mechanism configured to move the movable arm automatically from a retracted position to a predetermined position optimized for illuminating the portable electronic device; and
   a housing having an inside and an outside, the housing movably attached to the movable arm and configured to protect the light source in the retracted position, wherein the deployable arm is configured or automatically move the light source from the inside of the housing in the retracted position to the outside of the housing in the predetermined position.

22. The apparatus of claim 21 wherein the predetermined position optimized for illuminating the portable electronic device comprises a deployed position, and wherein the deployment mechanism is configured to move the movable arm automatically from the retracted position to the deployed position.

23. The apparatus of claim 21 wherein the retracted position comprises a closed position of the apparatus.

24. The apparatus of claim 23 wherein the light source is inoperative while the apparatus is in the closed position.

25. The apparatus of claim 22 wherein the deployed position comprises an open position of the apparatus.

26. The apparatus of claim 25 wherein the light source is operative while the apparatus is in the open position.

27. The apparatus of claim 21 wherein the base comprises at least one fastener for removably attaching the apparatus to the portable electronic device.

28. The apparatus of claim 27 wherein the base further comprises at least one connector for connecting the apparatus to the portable electronic device.

29. The apparatus of claim 28 wherein the connector is configured to provide physical and electrical connectivity between the apparatus and the portable electronic device.

30. The apparatus of claim 21 wherein the base comprises a plurality of fasteners for removably attaching the apparatus to the portable electronic device.

31. The apparatus of claim 21 wherein the deployment mechanism comprises a button, lever, trigger or switch.

32. The apparatus of claim 21 wherein the light source is at least partially surrounded by the housing.

33. The apparatus of claim 21 wherein the housing comprises a concave portion sufficient to substantially envelop the movable arm and the light source inside in the retracted position.

34. The apparatus of claim 33 wherein the interior substantially concave portion of the housing is made of reflective material.

35. The apparatus of claim 34 wherein the reflective material enhances the brightness of light emanating from the light source.

36. The apparatus of claim 35 wherein the movable arm comprises at least one segment.

37. The apparatus of claim 36 wherein the movable arm comprises more than one segment.

38. The apparatus of claim 37 wherein the segments of the movable arm are movably connected.

39. The apparatus of claim 21 wherein the predetermined position comprises a deployed position, and wherein the deployment mechanism is configured to move the movable arm from a non-deployed position to the deployed position.

40. An illumination apparatus comprising:
a base configured to be attachable to a portable electronic device;
a light source;
a deployable arm coupling the light source to the base;
a deployment mechanism configured to move the deployable arm between a retracted state in which the deployable arm assumes a non-interfering position relative to operation of the portable electronic device to a deployed state in which the deployable arm is positioned such that the light source illuminates the portable electronic device; and
a housing having an inside and an outside, the housing movably attached to the deployable arm and configured to protect the light source in the retracted state, wherein the deployable arm is configured to automatically move the light source from the inside of the housing in the retracted state to the outside of the housing in the deployed state.

41. The apparatus of 40 wherein the retracted state comprises a closed position of the apparatus.

42. The apparatus of 41 wherein the closed position comprises the deployable arm being substantially horizontally positioned to the base.

43. The apparatus of claim 42 wherein the light source is inoperative while the apparatus is in the closed position.

44. The apparatus of claim 43 wherein the deployed position comprises an open position of the apparatus.

45. The apparatus of claim 44 wherein the open position comprises the deployable arm being substantially vertically positioned to the base.

46. The apparatus of claim 44 wherein the light source is operative while the apparatus is in the open position.

47. The apparatus of claim 46 wherein the base comprises at least one fastener for attaching the apparatus to the portable electronic device.

48. The apparatus of claim 47 wherein the base further comprises at least one connector for connecting the apparatus to the portable electronic device.

49. The apparatus of claim 48 wherein the connector is configured to provide physical and electrical connectivity between the apparatus and the portable electronic device.

50. The apparatus of claim 40 wherein the deployment mechanism comprises a button, lever, trigger or switch.

51. The apparatus of claim 40 wherein activating the deployment mechanism causes the deployable arm to transition from the retracted state to the deployed state.

52. The apparatus of claim 40 wherein the light source is at least partially surrounded by the housing.

53. The apparatus of claim 1 wherein the housing comprises a concave portion sufficient to substantially envelop the deployable arm and the light source inside in the retracted state.

54. The apparatus of claim 53 wherein the interior substantially concave portion of the housing is made of reflective material.

55. The apparatus of claim 54 wherein the reflective material enhances the brightness of light emanating from the light source.

56. The apparatus of claim 55 wherein the deployable arm comprises at least one segment.

57. The apparatus of claim 56 wherein the deployable arm comprises more than one segments.

58. The apparatus of claim 57 wherein the segments of the deployable arm are movably connected.

59. An illumination apparatus comprising:
a base configured to be attachable to a portable electronic device;
a light source;
a deployable arm coupling the light source to the base;
a deployment mechanism configured (i) to move the deployable arm automatically from a non-deployed position to a predetermined position for illuminating the portable electronic device, and (ii) to cause the light source to emit light; and
a housing having an inside and an outside, the housing movably attached to the deployable arm and configured to protect the light source in the non-deployed position, wherein the deployable arm is configured to automatically move the light source from inside of the housing in the non-deployed position to outside of the housing in the predetermined position.

60. The apparatus of claim 59 wherein a single user interaction causes the deployment mechanism both to move the deployable arm to the predetermined position and to cause the light source to emit light.

61. The apparatus of claim 59 wherein the deployment mechanism comprises a button, lever, trigger or switch.

62. The illuminating apparatus of claim 59, wherein the housing comprises a concave portion sufficient to substantially envelope the deployable arm and the light source inside in the non-deployed position.

* * * * *